US006059088A

United States Patent [19]

Sekine et al.

[11] Patent Number: 6,059,088

[45] Date of Patent: May 9, 2000

[54] RESIN STATOR FOR A TORQUE CONNECTOR

[75] Inventors: Katsumi Sekine, Miyato-Nihomatsu; Takao Fukunaga, Neyagawa, both of Japan

[73] Assignees: NOK Corporation, Neyagawa; Exedy Corporation, Osaka, both of Japan

[21] Appl. No.: 08/948,954

[22] Filed: Oct. 10, 1997

[30] Foreign Application Priority Data

Oct. 11, 1996 [JP] Japan .................................. 8-287303

[51] Int. Cl.[7] .................................................. F16H 41/24

[52] U.S. Cl. .................................. 192/107 T; 192/41 R; 192/113.32

[58] Field of Search ................................ 192/3.21, 3.34, 192/41 R, 45, 45.1, 107 T, 113.32; 60/341, 345; 415/123, 200

[56] References Cited

U.S. PATENT DOCUMENTS

| | | | |
|---|---|---|---|
| 5,094,076 | 3/1992 | Henricks | 60/345 |
| 5,431,536 | 7/1995 | By et al. | 415/200 |
| 5,655,875 | 8/1997 | Sekine | 415/123 |
| 5,760,514 | 6/1998 | Taniguchi et al. | 192/41 R X |

FOREIGN PATENT DOCUMENTS

| | | |
|---|---|---|
| 22210-1992 | 2/1992 | Japan . |
| 254255/1996 | 10/1996 | Japan . |

*Primary Examiner*—Richard M. Lorence
*Attorney, Agent, or Firm*—Fish & Richardson P.C.

[57] ABSTRACT

In a resin-made stator comprising an annular plate portion (2) integrally formed toward an inner peripheral direction on an end of a cylindrical portion (1) in an axial direction or at an adjacent portion thereof, and an annular metal fitting (4) integrally held on the inner peripheral end of said cylinder portion (1) by an insert molding, a structure in which no crack is generated in the plate portion (2) even when the resin is shrunken and an excellent durability is given is provided, a desired number of notch portions (3) being provided on the inner peripheral end portion of said plate portion (2) close to the metal fitting end surface and a circumferential continuous end portion (6) having a predetermined inner diameter being provided on the inner peripheral end portion of the opposite end surface to the metal fitting of said plate portion (2) all around the periphery.

4 Claims, 3 Drawing Sheets

RESIN STATOR FOR A TORQUE CONNECTOR

BACKGROUND OF THE INVENTION

1. Field of the Invention

The present invention relates to a stator used for a torque converter of an automatic transmission for an automotive vehicle.

2. Prior Art

Conventionally, as shown in FIGS. 5 and 6, there has been known a resin-made stator comprising an annular plate portion 2 integrally formed toward an inner peripheral direction on an end (a right end in FIG. 6) of a cylindrical portion 1 in an axial direction or an adjacent portion thereof, a desired number (four in FIG. 5) of notch portions 3 provided on an inner peripheral end portion of the plate portion 2 at equal intervals, and an annular metal fitting 4 integrally held on the inner peripheral end of the cylinder portion 1 by an insert molding.

Specifically, the annular metal fitting 4 is constituted by an outer race of a one-way clutch, and a lubricating fluid (ATF) flows in the inner peripheral end of the stator as shown by an arrow in FIG. 6 in order that the one-way clutch smoothly operates. The notch portion 3 provided on the inner peripheral end portion of the plate portion 2 serves to guide the flow of the lubricating fluid, and is provided in such a manner that the notch portion 3 extends through the plate portion 2 in a thickness direction thereof (an axial direction) as shown in the drawing.

However, in the above stator, since the notch portion 3 is provided in a manner so as to extend through the plate portion 2 in the thickness direction thereof as mentioned above, the inner peripheral end portion of the plate portion 2 forms "a discontinuing portion" which does not continue in a circumferential direction. Accordingly, the following disadvantage is caused by the above structure.

Accordingly, the plate portion 2 is deformed immediately after the stator is molded or by a shrinkage of the resin under a high temperature atmosphere condition. Particularly, as a result that the inner peripheral end portion of the plate portion 2 is discontinuous in the circumferential direction, the plate portion 2 is deformed in such a manner that an angle in an opening of the notch portion 3 becomes large. Therefore, due to this deformation, a tensile stress to the circumferential direction as shown by an arrow in FIG. 5 is applied around the notch portion 3, so that a crack 5 may be generated in the plate portion 2.

SUMMARY OF THE INVENTION

The present invention is made by taking the above problem into consideration and an object of the present invention is to provide a resin-made stator in which no crack is generated in a plate portion even when the resin is shrunken, thereby having an excellent durability.

In order to achieve the above object, in accordance with the present invention, there is provided a resin-made stator comprising an annular plate portion integrally formed toward an inner peripheral direction on an end of a cylindrical portion in an axial direction or an adjacent portion thereof, and an annular metal fitting integrally held on the inner peripheral end of said cylinder portion by an insert molding, in which a desired number of notch portions are provided on the inner peripheral end portion of said plate portion close to the metal fitting end surface, and a circumferential continuous end portion having a predetermined inner diameter is provided on the inner peripheral end portion of the opposite end surface to the metal fitting of said plate portion all around the periphery.

In one embodiment of the present invention, the notch portions are provided in such a manner as to open to the innermost peripheral end portion of the plate portion in parallel to the circumferential continuous end portion in an axial direction.

The annular step portion may have an inner diameter which is relatively large in the metal fitting end and is relatively small in the opposite end of the metal fitting is provided on the inner peripheral end portion of the plate portion, and the notch portions are provided in such a manner as to have a cross section of a substantial L-shape along a cross section of said step portion.

Assure a desired number of notch portions are provided on the inner peripheral end portion of said plate portion close to the metal fitting end surface, and a circumferential continuous end portion having a predetermined inner diameter is provided on the inner peripheral end portion of the opposite end surface to the metal fitting of the plate portion all around the periphery, "a circumferential continuity" of the plate portion in the inner peripheral end portion can be secured by the latter endless circumferential continuous end portion. Accordingly, no strong circumferential tensile stress is applied around the notch portion, which is generated in the conventional art, so that it is possible to prevent the crack from generating in the plate portion.

In addition, since the notch portions are provided in such a manner as to open to the innermost peripheral end portion of the plate portion in parallel to the circumferential continuous end portion in the axial direction, a lubricating fluid flowing along the notch portion at a time of operation securely reaches the innermost circumferential end portion of the plate portion and further flows out to one side in the axial direction from the innermost circumferential end portion. Accordingly, even when the endless circumferential continuous end portion having the above structure is provided on the inner peripheral end portion of the opposite end of the metal fitting of the plate portion, the flow of the lubricating fluid is never stopped by the step portion.

DETAILED DESCRIPTION OF THE PREFERRED EMBODIMENT

An embodiment in accordance with the present invention will be explained below with reference to the accompanying drawings.

Figure 1:
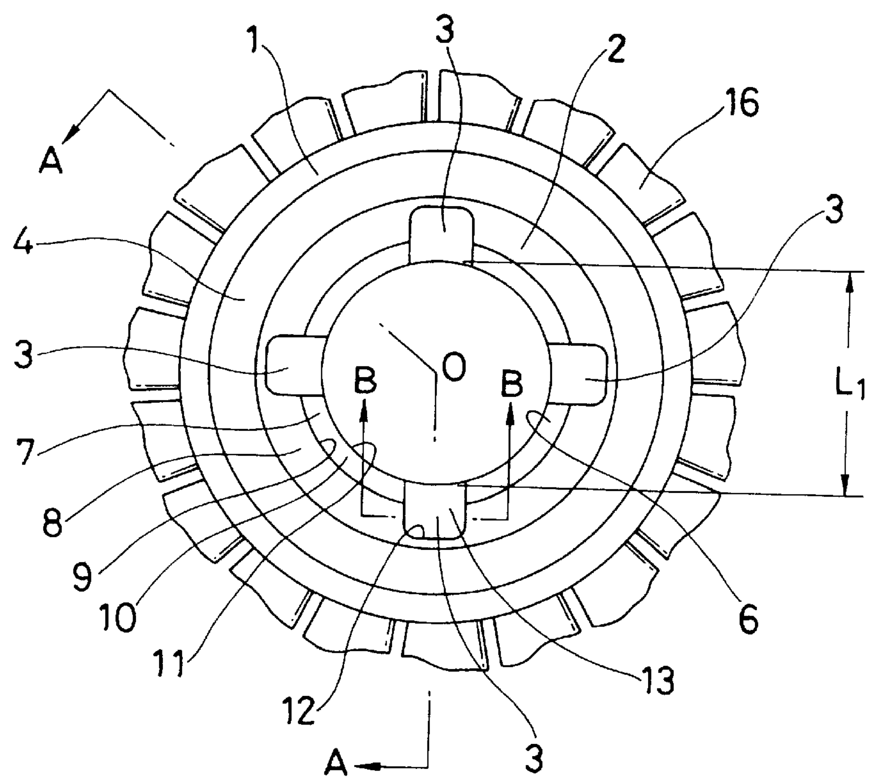
FIG. 1 is a front view which shows the main portion of a stator in accordance with an embodiment of the present invention.
Figure 2:
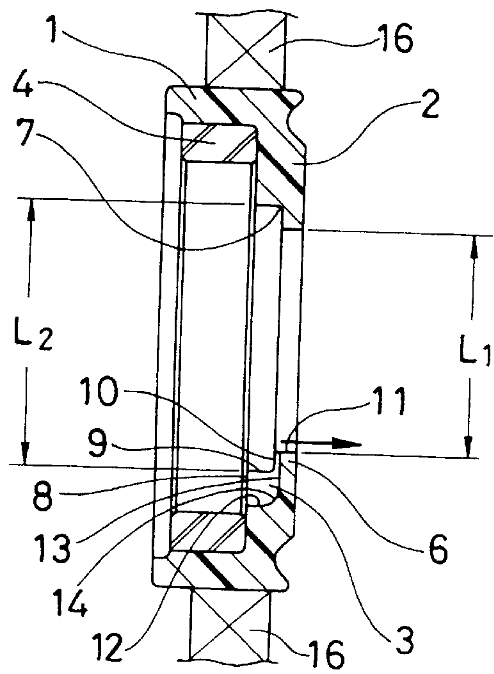
FIG. 2 is a cross sectional view taken along a line A–O–A in FIG. 1.
Figure 3:
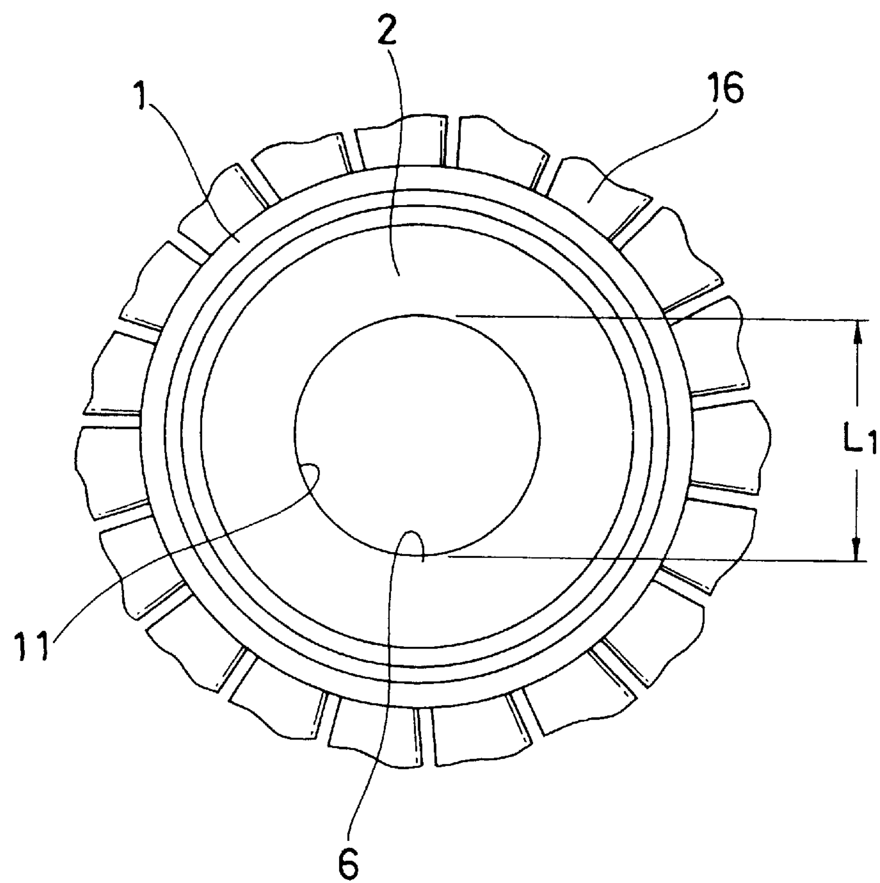
FIG. 3 is a view which shows a back surface of a main portion of the stator.

As shown in FIGS. 1 to 3, a stator in accordance with the embodiment is molded by using a phenol resin and comprises an annular plate portion 2 integrally formed toward an inner peripheral direction on an end (a right end in FIG. 2) of a cylindrical portion 1 in an axial direction or at an adjacent portion thereof, and an outer race of one-way clutch corresponding to an annular metal fitting 4 integrally held on the inner peripheral end of the cylinder portion 1 by an insert molding. Further, the stator has the following characteristic structures.

Accordingly, four notch portions 3 are provided on the inner peripheral end portion of the plate portion 2 close to the metal fitting end surface (a left end surface in FIG. 2) at equal intervals, and a circumferential continuous end portion 6 having a predetermined inner diameter $L_1$ is provided on the inner peripheral end portion of the opposite end surface to the metal fitting (a right end surface in FIG. 2) of the plate portion 2 all around the periphery. Since the former notch portion 3 is provided in the above manner, a passage guide of the lubricating fluid is secured, and further, since the latter endless circumferential continuous end portion 6 is provided, "a circumferential continuity" of the inner peripheral end portion of the plate portion 2 is secured.

Further, in the stator, the notch portions 3 provided on the inner peripheral end portion of the end surface close to the metal fitting in the plate portion 2 are respectively provided in such a manner as to open to the innermost peripheral end portion of the plate portion 2 in parallel to the circumferential continuous portion 6 in the axial direction.

Accordingly, an annular step portion 7 having an inner diameter which is relatively large ($L_2$) in the metal fitting end (left in FIG. 2) and is relatively small ($L_1$) in the opposite end to the metal fitting (right in FIG. 2) is provided on the inner peripheral end portion of the plate portion 2, and the notch portions 3 provided on the inner peripheral end portion of the end surface close to the metal fitting in the plate portion 2 are respectively formed in such a manner as to have a cross section of a substantial L-shape along a cross sectional shape of the step portion 7. The notch portions 3 are respectively opened to four surfaces comprising an metal fitting side end surface 8 of the plate portion 2, a large diameter side inner peripheral surface 9 continuously formed thereto, a radial direction step surface 10 continuously formed thereto, and a small diameter side inner peripheral surface 11 as the innermost peripheral surface continuously formed thereto. The above L-shape is formed by six surfaces comprising inner wall surfaces 12 and 13 of the notch portion 3 in addition to the above four surfaces.

Further, it is preferable to apply the following shape to the notch portion 3.

(1) As shown in FIG. 2, it is preferable to round a crossing portion 14 of the inner wall surfaces 12 and 13 of the notch portion 3 with taking a flow of the resin at a time of molding into consideration.

Figure 4:
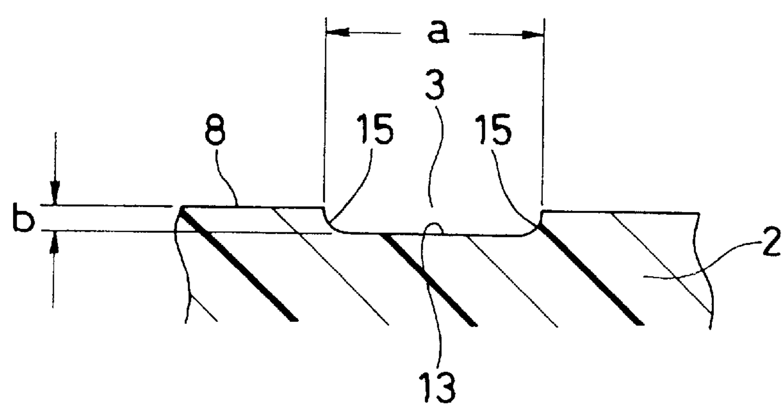
FIG. 4 is an enlarged cross sectional view taken along a line B—B in FIG. 1.
Figure 5:
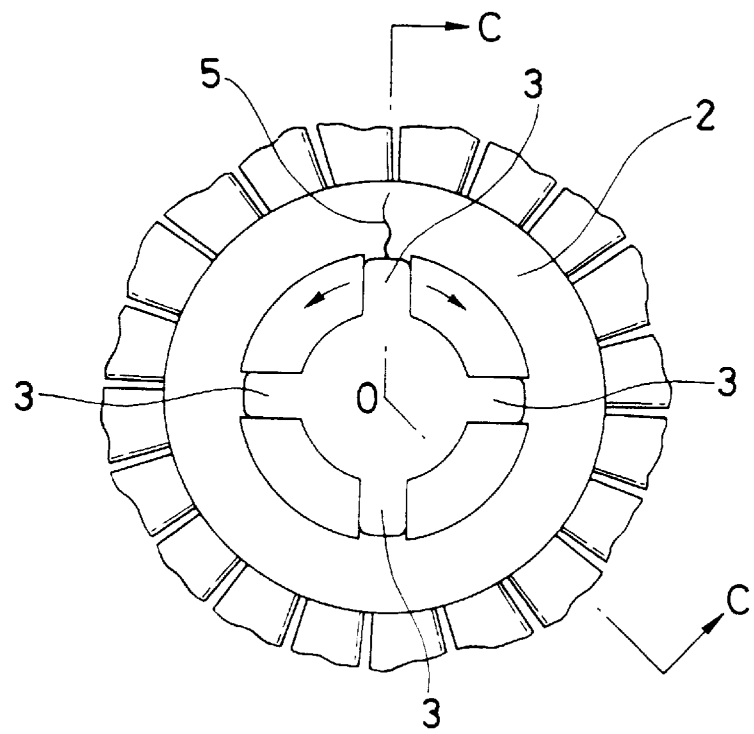
FIG. 5 is a front view which shows the main portion of a stator in accordance with the conventional art.
Figure 6:
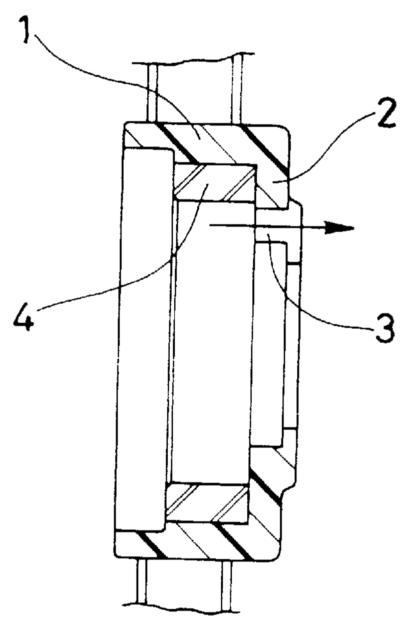
FIG. 6 is a cross sectional view taken along a line C–O–C in FIG. 5.

(2) As shown in FIG. 4, it is preferable to round an inner portion end portion 15 of the notch portion 3 as large as possible in order to decrease a stress concentration at a time when the resin is shrunken.

(3) As shown in FIG. 4, it is preferable to set a width a of the notch portion 3 as large as possible and set a height (a depth) b thereof as small as possible in order to decrease a stress concentration.

Still further, a blade portion 16 is integrally formed on the outer peripheral end of the cylindrical portion 1, and further, an outer peripheral cylinder portion (not shown) is integrally formed on the outer peripheral end of the blade portion 16.

In the stator provided with the above structure, since the four notch portions 3 are provided on the inner peripheral end portion of the plate portion 2 close to the metal fitting end surface in such a manner as to have equal intervals, and a circumferential continuous end portion 6 having a predetermined inner diameter $L_1$ is provided on the inner peripheral end portion of the opposite end surface to the metal fitting of the plate portion 2 all around the periphery, "a circumferential continuity" of the inner peripheral end portion of the plate portion 2 is secured by the latter endless circumferential continuous end portion 6. Accordingly, since the great deal of tensile stress in the circumferential direction is not applied around the notch portion 3 as in the conventional manner and the significant stress concentration portion is not generated, the plate portion 2 is effectively prevented from generating cracks, so that the durability of the stator can be improved. Further, since the deformation of the resin is prevented for the same reason, a dimensional accuracy in each portion of the stator can be improved.

Further, in the case that the opposite end surface (also referred to as a thrust end plate surface) to the metal fitting of the plate portion 2 is integrally formed with a thrust washer, security of the sliding area and effect of the shape of the thrust washer fluid groove can be directly obtained.

Still further, since the notch portion 3 provided on the inner peripheral end portion of the metal fitting side end surface of the plate portion 2 is opened to the innermost peripheral end portion of the plate portion 2, that is, the notch portion is formed in such a manner as to have the cross section of the substantial L-shape along the cross section of the annular step portion 7 provided on the inner peripheral end portion of the plate portion 2, so as to be opened to the small diameter end inner peripheral surface 11 corresponding to the innermost end portion of the plate portion 2, the lubricating fluid flowing along the notch portion 3 at a time of operation certainly reaches the innermost peripheral end portion of the stator and is flown out from here in the axial direction as shown in FIG. 2. Accordingly, even when the endless circumferential continuous end portion 6 is provided on the inner peripheral end portion of the opposite end portion to the metal fitting of the plate portion 2, the lubricating fluid is not stopped due to the step portion 6, so that the lubricating fluid can be securely flown in the inner periphery of the stator in a smooth manner.

The present invention can obtain the following effects.

Accordingly, in the stator of the present invention having the above structure, since a desired number of notch portions are provided on the inner peripheral end portion of said plate portion close to the metal fitting end surface, and a circumferential continuous end portion having a predetermined inner diameter is provided on the inner peripheral end portion of the opposite end surface to the metal fitting of the plate portion all around the periphery, "a circumferential continuity" of the plate portion in the inner peripheral end portion can be secured by the latter endless circumferential continuous end portion. Accordingly, no strong circumferential tensile stress is applied around the notch portion, which is generated in the conventional art, and the significant stress concentration is not generated, so that it is possible to effectively prevent the crack from generating in the plate portion, thereby improving the durability of the stator. Further, for the same reason, the resin is prevented from being deformed, so that the dimensional accuracy in each part of the stator can be improved.

In addition to this, in the stator having the above structure, the lubricating fluid flowing along the notch portion at a time of operation securely reach the innermost circumferential end portion of the stator and further flows out to the axial direction from here. Accordingly, even when the endless circumferential continuous end portion is provided on the inner peripheral end portion of the opposite end of the metal fitting of the plate portion, the flow of the lubricating fluid is never stopped due to the step portion, thereby securing a smooth flow of the lubricating fluid in the inner periphery of the stator.

What is claimed is:

1. A resin stator for a torque converter, comprising:

a cylindrical portion;

an annular plate portion integrally formed on an end of said cylindrical portion in an axial direction and extending inwardly in a radial direction; and an annular metal fitting integrally held on an inner peripheral surface on the other end of said cylindrical portion in the axial direction by an insert molding;

said annular plate portion being provided on an inner end surface adjacent said metal fitting with an annular step portion having a given inner diameter ($L_2$);

a given number of recesses being formed in said inner end surface of said plate portion and in said step portion;

said recesses being arranged at an equal distance in a circumferential direction and extending inwardly in a radial direction with a given width (a) and a given depth (b);

said annular plate portion being provided on the other end surface opposite from said end surface with a circumferential continuous end portion having a given inner diameter ($L_1$);

said inner diameter ($L_2$) of said step portion being set to be greater than said inner diameter ($L_1$) of said end portion.

2. A stator as recited in claim 1, wherein the recesses are provided in such a manner as to open to the innermost peripheral end portion of the annular plate portion in parallel to the circumferential continuous end portion in an axial direction.

3. A stator as recited in claim 2, wherein the inner diameter the metal fitting of the annular step portion decreases from $L_2$ at an end adjacent to a diameter $L_1$ at an end portion of the plate portion distal the cylindrical portion, and the recesses have a cross section of a substantial L-shape along a cross section of said step portion.

4. A stator for a torque converter, comprising:

a body formed of resin, the body including:

a cylindrical portion (1) defining a first bore with a first diameter;

an annular plate portion (2) integrally formed on a first end of said cylindrical portion, said plate portion including:

a second bore with a second diameter ($L_2$), smaller than the first diameter, an opening having a third diameter ($L_1$), smaller than the second diameter ($L_2$), extending through the plate portion, an inner peripheral surface (8) extending radially between the first bore and the second bore, and a plurality of radially extending recesses (3) formed within and circumferentially spaced around the inner peripheral surface; each of said recesses having a width and a depth; and an annular metal fitting (4) disposed within the first bore and having an inner surface engaging the inner peripheral surface of the annular plate portion of the body.

* * * * *